2,999,104
PROCESS FOR SIMULTANEOUS ALCOHOLYSIS AND GASPROOFING OF TUNG OIL
Leo A. Goldblatt, El Cerrito, Calif., and Lucien L. Hopper and Eric T. Rayner, New Orleans, La., assignors to the United States of America as represented by the Secretary of Agriculture
No Drawing. Original application Apr. 10, 1959, Ser. No. 805,647. Divided and this application Jan. 8, 1960, Ser. No. 6,335
1 Claim. (Cl. 260—410.6)

A non-exclusive, irrevocable, royalty-free license in the invention herein described, throughout the world for all purposes of the United States Government, with the power to grant sublicenses for such purposes, is hereby granted to the Government of the United States of America.

This application is a division of application S.N. 805,647, filed April 10, 1959.

This invention relates to the production of tung oil alkyd resins. More particularly, it provides a process for the simultaneous alcoholysis and gasproofing of tung oil, and production of alkyd resins therefrom.

In the prior art, oil-modified alkyds have usually been prepared by alcoholizing a glyceride oil with a suitable polyol at alcoholysis temperatures in the presence of a catalyst, and subsequently reacting the resulting hydroxy esters with suitable carboxylic acids. Acids conventionally used include monobasic fatty acids such as tall oil fatty acids, soya oil fatty acids, and the like, in conjunction with dibasic acids such as phthalic acid, isophthalic acid, adipic acid and the like. The polyols commonly used include glycerol, pentaerythritol, trimethylolethane, trimethylolpropane, sorbitol and the like; and the glyceride oils include linseed, soybean (soya), dehydrated castor, tung, and the like. For example, in the production of a typical soybean oil alkyd resin the following procedure would be employed: 900 grams of soybean oil and 0.5 g. of litharge, as alcoholysis catalyst, are heated together to 400° F. Then 41 g. of pentaerythritol is added and the mixture is heated to about 446°–474° F. (230°–245° C.) and held at this temperature for 30 minutes for alcoholysis. The mass is then allowed to cool to 400° F., and 82 g. of isophthalic acid is added. The temperature is brought to 500° F., and cooking is carried out at this temperature for about 4 hours or longer, depending on the viscosity and acid number desired in the finished product.

Although tung oil is generally considered to be one of the best if not the very best oil for use in oleoresinous and alkyd type formulations—to which it imparts fast drying, good water resistance, and toughness characteristics—the cooking of tung oil resins is extremely difficult and has been an art requiring considerable skill and know-how on the part of the operator. This is due primarily to the fact that the chemical composition and hence the properties of tung oil are unique among the glyceride oils. Typically tung oil contains about 75% to 80% of eleostearic acid, a fatty acid containing three double bonds or points of unsaturation occurring in a conjugated or alternate system in the structure. None of the other common glyceride oils contain eleostearic acid. In cooking tung oil resin formulations, there is a pronounced tendency and danger of producing unwanted gelation—the formation of an insoluble and infusible gel in the kettle employed for the cooking operation. Gelation is especially likely to occur if the tung oil resins are cooked to a temperature of at least 565° F., the temperature necessary to gasproof the resin as well as to aid in the attainment of a suitable viscosity. The resin is said to be gasproof if the surface coatings which it ultimately forms dry smooth and glossy in the presence of corrosive atmospheres such as water vapor, CO, $CO_2$, sulfur dioxide fumes, nitrogen oxides, and the like. The gasproofing is a phenomenon which probably involves the disruption of part of the double bonds in the chemical structure of the tung oil. A further complication in the cooking of tung oil resins according to prior art procedures is the fact that at about 550° F. an exothermic reaction occurs, probably due to a partial polymerization of the tung oil, causing the temperature to rise spontaneously and thus making difficult the proper control of temperature.

A primary object of the present invention is to provide a process for simultaneously gasproofing and alcoholizing tung oil without danger of gelation. Another object is to provide gasproof tung oil alkyds suitable for use in surface coatings and the like.

We have discovered that gasproof, tung oil alkyds are produced without danger of gelation if substantially all of the tung oil is alcoholized with the polyol at gasproofing temperatures, instead of at the lower temperatures conventionally employed for alcoholysis of glyceride oils, while at the same time maintaining an excess of hydroxyl during the alcoholysis.

In general, in accordance with the present invention, non-gelling and gasproof tung oil alkyds are produced by heating at gasproofing temperatures in the presence of an alcoholysis catalyst a mixture of tung oil and a polyol or polyols of the type commonly employed for alcoholizing a glyceride oil, for a period of time sufficient to alcoholize substantially all of the tung oil, while maintaining an excess of hydroxyl during the alcoholysis, and reacting the resulting hydroxy esters with any of the carboxylic acids conventionally employed in the alkyd resin-making art.

Polyols suitable for alcoholizing tung oil in the process of the present invention include trimethylolethane, trimethylolpropane, sorbitol, pentaerythritol, glycerol and the like, either singly or in various combinations. Catalysts such as litharge, zinc naphthenate, fumaric acid and the like can be used for the alcoholysis. Carboxylic acids suitable for reacting with the hydroxy esters produced by the alcoholysis include monobasic fatty acids such as tall oil fatty acids, soya oil fatty acids, linseed fatty acids, and the like, and dibasic acids such as phthalic acid or anhydride, isophthalic acid, hexahydrophthalic acid, adipic acid, azelaic acid, and the like. The carboxylic acids can be used singly or in various combinations. It is generally preferred to employ a monobasic fatty acid in conjunction with a dibasic acid in making the tung oil alkyd.

In the heating operation, the types of apparatus normally used in the alkyd resin-making art can be employed. It is preferred to conduct the preparation of the tung oil alkyd using adequate stirring or mixing of the reactants. It is also preferred to employ an inert gas such as nitrogen to protect the reaction mixture, although this is not essential. In controlling the temperature, the generally preferred procedure is to heat the mixture of tung oil and polyol rather rapidly to the gasproofing temperature, at least 565° F., and then maintain this temperature until substantially all of the tung oil is alcoholized and gasproofing has occurred. The desired extent of alcoholysis and gasproofing can usually be achieved in about 8 minutes at about 570° F. under the preferred conditions. The time required will depend on the particular gasproofing temperature used by the operator. Following alcoholysis and gasproofing, it is then usually preferred to discontinue heating or reduce the heat while the desired amount of monobasic fatty acid and polyol for its esterification are added. Heating is then resumed, the temperature being preferably brought up to about 520° F. Although this temperature is not critical, it should preferably be high enough to facilitate solubilization of the particular dibasic acid used in the alkyd formulation. When the preferred temperature is reached, the desired amount of dibasic acid and esterification catalyst are added. Heating is continued, preferably at a temperature not exceeding about 520° F., until a clear pill is obtained. The heating is subsequently continued at a temperature between about 475° and 500° F., as in prior art procedures, until the resulting tung oil alkyd resin has a sufficiently low acid value (below about 11, so as not to react with reactive pigments which the operator might desire to incorporate) and a suitable viscosity for the intended use.

The heating operation can also be carried out by heating the mixture of tung oil, monobasic fatty acids, polyol, and catalyst to the gasproofing temperature, and maintaining this temperature until substantially all of the tung oil is alcoholized and gasproofing has occurred. In this case, attainment of the gasproofing temperature is generally somewhat slower due to the evolution of water as a result of the concurrent esterification reaction between the monobasic fatty acids and the polyol. An advantage of adding the monobasic fatty acids prior to rather than after the completion of heating for the alcoholysis and gasproofing is that esterification of the fatty acids is facilitated at the higher, gasproofing temperature.

The relative proportion of polyol used for alcoholysis of tung oil according to the present invention can be varied considerably. However, it is important that there be present at least sufficient polyol to alcoholize substantially all of the tung oil and to maintain an excess of hydroxyl during the alcoholysis. It is generally preferred to use about 1.3 equivalents of polyol to alcoholize each equivalent of tung oil. Amounts of polyol greater than this can also be used, but the color of the finished alkyd product may be slightly darker than when the preferred proportion of polyol is employed. The amount of catalyst used for the alcoholysis can be varied within the limits commonly employed in the prior art.

The quantity of monobasic fatty acids incorporated into the alkyd formulation can be varied widely, as for example as a means of producing a short-oil or medium-oil or long-oil alkyd. The monobasic fatty acids can be added eithere prior to or subsequent to completion of the alcoholysis and gasproofing of the tung oil. In either case, it is desirable that sufficient polyol be present for esterification of the quantity of fatty acids used. It is generally preferable to use about 1.3 equivalents of polyol for esterification of each equivalent of the fatty acids. This additional amount of polyol can either be added along with the fatty acids after the initial alcoholysis and gasproofing of the tung oil has been completed, as in the preferred procedure, or it can be added prior to or during the alcoholysis of the tung oil.

The amount of dibasic acids, considered in the art to be the "resin" or non-oil part of the alkyd formulation, can be varied widely as in prior art practices depending upon the particular type of tung oil alkyd which the operator desires to produce. For example, a short-oil tung oil alkyd (having a low oil-to-"resin" ratio) would contain about 40 to 50% by weight of dibasic acid; a medium-oil alkyd, about 30 to 40% by weight of dibasic acid; and a long- or very long-oil alkyd, about 10 to 30% by weight of dibasic acid. As will be recognized by those skilled in the art, the oil-to-"resin" ratio can also be varied by keeping the amount of dibasic acids in the formulation constant and varying the amounts of any or all of the other constituents.

The tung oil alkyds provided by this invention are particularly adapted for use in "varnish concentrates" in which about one part by weight of the alkyd is mixed with about one part by weight of a varnish solvent to provide a mixture containing from about 40 to 60 (and preferably 50) percent solids, incorporating into the mixture the usual amounts of varnish driers. In the production of varnish concentrates, the tung oil alkyds can be mixed with any of the solvents and driers usually used in the manufacture of varnish. Illustrative examples of suitable solvents include mineral spirits, turpentine, varnish makers' and painters' naphtha, toluene, xylene, and the like. Illustrative examples of suitable driers include cobalt naphthenate, cobalt lineoleate, lead naphthenate, lead tallate, and the like. Varnishes prepared from the tung oil alkyds of the present invention produce films having many desirable characteristics, including good color, very good flexibility, and outstanding water resistance.

The tung oil alkyds of the invention are also useful in the formulation of other protective coatings, as for example in enamels. Enamels can be prepared by incorporating the usual pigments in varnishes prepared from the tung oil alkyds.

The following examples are illustrative of the details of at least one method of practicing the present invention.

*Example 1*

100 grams of tung oil, 17.5 grams of trimethylolethane, and 0.033 gram of litharge were placed in a glass reaction flask. The flask was thoroughly flushed with nitrogen gas, and then the contents were mixed by stirring with a mechanical stirrer and heated to a temperature of 572° F. in about 13 minutes. The stirring was continued throughout the preparation of the alkyd. The temperature was maintained at about 572° F. for 8 minutes, and then heating was discontinued. There was no tendency toward gel formation. The alcoholysis of the tung oil was substantially complete after the 8 minutes at 572° F., as indicated by the fact that in an exactly comparable experiment only a small amount of polyol was extractable with water from a solution of the alcoholized product in xylene, although substantially complete recovery of the polyol could be obtained in this way before alcoholysis. The triene content, as eleostearic acid, decreased from about 60% at the start to about 8% in the alcoholized product.

The temperature of the alcoholized tung oil product was allowed to drop to 536° F., and 100 grams of tall oil fatty acids and 17.5 grams of trimethylolethane were added. (The tall oil fatty acids used was a low-rosin grade, containing about 1% of rosin fatty acids; 46% linoleic acid, 51% oleic acid, and 3% saturated acids. It had the following characteristics: iodine value, 127; acid number, 194; titer, 6; color, 5; equivalent weight, 290.) Heating was resumed, and the temperature was brought up to 518° F. over about a 13 minute period, at which time 30 grams of isophthalic acid and 0.033 gram of litharge were added. A clear pill was obtained after about ½ hour of heating at 518° F. The heat was reduced and the temperature was maintained at about 480° F. for about 3¾ hours. The acid value of the tung oil alkyd product had been reduced to 7.2 by this time. The product was allowed to cool and thinned to 50% solids, by weight, with mineral spirits. The thinned product had a D viscosity on the Gardner-Holdt scale; its viscosity was 1.0 poise at 25° C. Its color corresponded to Hellige Color Disc No. 6.

To the thinned product (50% solids in mineral spirits) was added 0.02% cobalt and 0.2% lead driers, as naphthenates. The resulting preparation was tested as follows.

*Drying time.*—3 mil film air-dried in 6 hours (Reichhold Drying Time Recorder).

*Water resistance.*—Air-dried 3 mil films showed no visible effects after 24 hours in boiling water or after 72 hours in distilled water at 28° C.

*Resistance to salt water.*—Air-dried 3 mil film showed no visible effects after 1 hour in boiling salt water (3% by weight of NaCl).

*Gloss.*—Good (air-dried or baked films).

*Flexibility.*—Air-dried 3 mil film withstood ⅛ inch bend on mandrel.

*Baking tests.*—3 mil film baked dry in 10 minutes at 300° F., or in 30 minutes at 250° F.

An enamel formulation was prepared by pigmenting the above-tested preparation with an equal weight (solids basis) of titanium dioxide. The enamel formulation was tested as follows.

*Drying time.*—3 mil film air-dried in 6 hours (Reichhold Drying Time Recorder).

*Baking test.*—3 mil film baked dry in 30 minutes at 250° F., with good color retention.

*Gloss.*—Good (air-dried or baked films).

Example 2

100 grams of tung oil, 100 grams of tall oil fatty acids, 35.0 grams of trimethylolethane and 0.033 gram of litharge were placed in a glass reaction flask. The reactants were comparable to those used in Example 1. The flask was thoroughly flushed with nitrogen gas, and then the contents were mixed by stirring with a mechanical stirrer and heated to a temperature of 572° F. in about 45 minutes. The stirring was continued throughout the preparation of the alkyd. The temperature was maintained at 572° F. for 8 minutes, and then heating was discontinued. There was no tendency toward gel formation.

The temperature of the alcoholized tung oil product was allowed to drop to 536° F., at which time 30 grams of isophthalic acid and 0.033 gram of litharge were added. Heating was resumed and the temperature was brought to 518° F. A clear pill was obtained after about 25 minutes of heating at 518° F. The heat was reduced and the temperature was maintained at about 482° F. for about 4½ hours. The acid value of the tung oil alkyd product had been reduced to 3.0 by this time. The product was allowed to cool and thinned to 50% solids, by weight, with mineral spirits. The thinned product had a D viscosity on the Gardner-Holdt scale. Its color corresponded to Hellige Color Disc No. 6.

To the thinned product (50% solids in mineral spirits) was added 0.02% cobalt and 0.2% lead driers, as naphthenates. Air-dried 3 mil films prepared from this preparation showed no visible effects after 1 hour in boiling water.

We claim:

A process for simultaneously alcoholizing and gasproofing tung oil without danger of gelation comprising heating 1 part by weight of tung oil with at least about 0.136 part by weight of trimethylolethane in the presence of an alcoholysis catalyst at a temperature of at least 565° F. for at least about 10 minutes.

References Cited in the file of this patent

UNITED STATES PATENTS

| | | |
|---|---|---|
| 2,340,043 | Clare | Jan. 25, 1944 |
| 2,862,961 | Goreau | Dec. 2, 1958 |
| 2,891,919 | Christensen et al. | June 23, 1959 |

OTHER REFERENCES

Goldblatt: "Economic Botany," vol. 13, No. 4, Oct.-Dec. 1959, p. 354.